US012359140B2

(12) United States Patent
Schuetzle et al.

(10) Patent No.: US 12,359,140 B2
(45) Date of Patent: *Jul. 15, 2025

(54) BLENDS OF SYNTHETIC DIESEL FUEL AND PETROLEUM DIESEL FUEL WITH IMPROVED PERFORMANCE CHARACTERISTICS

(71) Applicant: Platinum Fuels, LLC, Sacramento, CA (US)

(72) Inventors: Robert Schuetzle, Sacramento, CA (US); Dennis Schuetzle, Grass Valley, CA (US)

(73) Assignee: Platinum Fuels, LLC, Sacramento, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/120,809

(22) Filed: Jun. 30, 2014

(65) Prior Publication Data

US 2015/0021231 A1    Jan. 22, 2015

Related U.S. Application Data

(60) Provisional application No. 61/958,236, filed on Jul. 22, 2013.

(51) Int. Cl.
*C10L 1/04* (2006.01)
*C01B 3/34* (2006.01)
*C10G 2/00* (2006.01)

(52) U.S. Cl.
CPC .............. *C10L 1/04* (2013.01); *C01B 3/34* (2013.01); *C10G 2/32* (2013.01); *C01B 2203/02* (2013.01); *C01B 2203/025* (2013.01); *Y02P 30/00* (2015.11)

(58) Field of Classification Search
CPC .... C10G 2/30; C10G 2/32; C10G 2/331–333; C10L 1/04–08; C10L 2200/0492
See application file for complete search history.

(56) References Cited

U.S. PATENT DOCUMENTS

| 5,689,031 | A | 11/1997 | Berlowitz et al. |
| 8,394,862 | B1 | 3/2013 | Schuetzle et al. |
| 8,741,001 | B1 | 6/2014 | Schuetzle et al. |
| 2003/0134912 | A1 | 7/2003 | Ding et al. |
| 2004/0128905 | A1 | 7/2004 | Clark et al. |
| 2004/0152930 | A1 | 8/2004 | O'Rear et al. |
| 2006/0006098 | A1* | 1/2006 | Espinoza ............... C10G 63/04 208/15 |
| 2007/0100177 | A1* | 5/2007 | Clark ...................... C10L 10/02 585/14 |
| 2008/0244966 | A1* | 10/2008 | Ansell ..................... C10L 1/08 44/436 |
| 2009/0293345 | A1 | 12/2009 | Esen et al. |
| 2010/0175320 | A1 | 7/2010 | Schuetzle et al. |
| 2011/0240288 | A1 | 10/2011 | Kibby et al. |
| 2012/0297665 | A1 | 11/2012 | Goerz, Jr. et al. |

FOREIGN PATENT DOCUMENTS

EP    583 836    *   2/1994    ............. C10G 65/12

OTHER PUBLICATIONS

Burnham, "User Guide for the GREET Fleet Footprint Calculator 1.1," (2009) http://greet.es.anl.gov/publications.
Burnham, "Summary of Updates in GREET1_2012 (Revision 2)," http://www.greet.es.anl.gov.
Burnham, "GREET Life-Cycle Model," http://www.greet.es.anl.gov.
Burnham, "Summary of Updates and Revisions in GREET 1 2016 (Revision 1)," http://www.greet.es.anl.gov.
Burnham, "Summary of Expansions, Updates, and Results in GREET 2016 Suite of Models," http://www.greet.es.anl.gov.
Suarez, Paz et al., "Comparing the lubricity of biofuels obtained from pyrolysis and alcoholysis of soybean oil . . . ," (2008) Fuel. vol. 88, pp. 1143-1147.
Berwick, M. HFRR Workshop, "Testing and Best Practices. Fuel Ratings Symposium," (2010) pp. 1-46.
Naik, SN, et al., "Production of first and second generation biofuels: A comprehensive review," Renewable and sustainable Energy Reviews (1020) vol. 14, pp. 578-597.
Aatola, Hannu, et al., "Hydrotreated Vegetable Oil (HVO) as a Renewable Diesel Fuel . . . ," SAE International Journal of Engines (2008) 1. 10.4271/2008-01-2500.
Alleman, T. & McCormich R., "Fischer-Tropsch Diesel Fuels—Properties and Exhaust Emissions . . . ," SAE Technical Paper Series (2003) 10.4271/2003-01-0763.
Elgowainy, A., "Well-to-Wheels Energy Use and Greenhouse Gas Emissions Analysis of Plug-in-Hybrid Vehicles," (2009) http://greet.es.anl.gov/publications.

* cited by examiner

*Primary Examiner* — Renee Robinson
(74) *Attorney, Agent, or Firm* — McKinney Law Group APC; Jeffrey A. McKinney

(57) ABSTRACT

The present invention provides a blended fuel and methods for producing the blended fuel, wherein a synthetic fuel derived from a alternative resources such as natural gas, associated gas, biomass, or other feedstocks is blended with a traditional, petroleum derived fuel. A blended fuel which includes greater than 5% by volume of the synthetic fuel has an overall improved lifecycle greenhouse gas content of about 2.5% or more compared to the petroleum derived fuel. Also, blending of the low carbon fuel to the traditional, petroleum fuel improves various performance characteristics of the traditional fuel by at least 5%.

7 Claims, 4 Drawing Sheets

BLENDS OF SYNTHETIC DIESEL FUEL AND PETROLEUM DIESEL FUEL WITH IMPROVED PERFORMANCE CHARACTERISTICS

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

BACKGROUND OF THE INVENTION

1. Field of the Invention

The present invention generally relates to blended fuels, where a synthetic diesel fuel, ideally derived from a production process that uses natural gas, natural gas liquids, associated or waste gas, carbon dioxide, landfill gas, biogas or other light hydrocarbon steam is blended with a traditional, petroleum derived fuel. Such blended fuels result in an overall improved well-to-wheels greenhouse gas content, as well as performance characteristics of the fuels, compared to the petroleum derived fuels.

2. Description of Related Art

Global demand for energy continues to rise at a significant rate, particularly among developing industrialized nations. Natural gas and other alternative resources are becoming more attractive as feedstocks for the production of liquid fuels due to increasing oil costs as well as for environmental reasons.

Different types of fuels produce different amounts of greenhouse gas during their entire lifecycle (e.g., during the fuel production, transportation, and consumption). Thus, they have different impact on the environment. One way to compare the greenhouse gas effect of each fuel is by calculating and comparing well-to-wheels greenhouse gas content to the petroleum baseline.

A well-to-wheels greenhouse gas content ("WWGGC") refers to a calculation that is done using a greenhouse gas model, such as Argonne National Laboratories GREET model or another similar greenhouse gas model. The model allows for the calculation of the amount of greenhouse gases that are produced throughout the entire lifecycle of the product (from "well to wheels"). The model takes into account, among other things, the production method, the feedstock used in the production, the type of fuel produced, transportation of the fuel to market, and the emissions produced from combustion of the fuel when it is used.

Petroleum derived fuels, such as gasoline and diesel fuel that are refined from oil using a traditional production method, produce a large amount of greenhouse gases. Their WWGGC calculated according to the GREET model is close to 100. Other fuels, such as first generation biofuels (e.g., ethanol derived from corn), also score close to or greater than 100 in terms of WWGGC calculated according to the GREET model, thus providing no significant WWGGC benefit over petroleum fuels.

Some of synthetic fuels that are produced from natural gas, natural gas liquids, carbon dioxide, and/or other light hydrocarbons (together "natural gas type feedstocks") using a conversion processes can achieve lifecycle greenhouse gas scores that are more than 20% lower than petroleum derived fuels (e.g., a WWGGC score of 80 or lower using the GREET model). While synthetic fuels produced from existing known methods today may achieve an improved WWGGC compared to petroleum fuels, when blended with petroleum fuels, the performance characteristics of the blended fuels are not improved or are about the same as those of the petroleum fuels. In some instances, blending such synthetic fuels with the petroleum fuel reduces the performance characteristics of the petroleum fuel, such as a cetane number, lubricity, and others.

Thus, there is a need for a synthetic fuel derived from a natural gas feedstock, which when blended with a petroleum fuel, not only significantly improves WWGGC, but also improves performance characteristics of the blended fuels. The present invention meets these needs as well as others and provides a substantial improvement over the prior art.

SUMMARY OF THE INVENTION

Embodiments of the invention provide a blended fuel which includes a petroleum fuel and a synthetic fuel produced from a natural gas type feedstock, where the natural gas type feedstock is converted into a synthetic fuel using a next generation process.

In embodiments of the invention, the synthetic fuel derived from a natural gas type feedstock has a well-to-wheels greenhouse content ("WWGGC") which is at least 10% lower than a WWGGC of the petroleum fuel. When the synthetic fuel in accordance with embodiments of the invention is blended at least 5% by volume (with the rest of the balance from the petroleum fuel), the blended fuel has two or more performance characteristics (measurable by ASTM standards) which are improved compared to the 100% petroleum derived fuel. For instance, when a synthetic diesel fuel in accordance with the present invention and a petro-diesel are blended, the blended fuel meets the ASTM D975 specification and has improved performance characteristics, such as lubricity, cetane number, sulfur content, and/or oxidative stability, compared to the petroleum diesel fuel.

In one aspect of the invention, a blended fuel comprises about 5% to about 95%, by volume, of a petroleum fuel and about 95% to about 5%, by volume, of a synthetic fuel produced from a natural gas type feedstock. The synthetic fuel is produced by a process where the natural gas type feedstock is first converted into syngas, and then the syngas is reacted with a catalyst to produce the synthetic fuel. In one embodiment of the innovation, carbon dioxide is also used as a feedstock further reducing the WWGGC score of the fuels produced by the process.

In one embodiment of the invention, the synthetic fuel has a well-to-wheels greenhouse gas content which is at least about 10% lower than a well-to-wheels greenhouse gas content of the petroleum fuel. The synthetic fuel also has at least two performance characteristic values measurable by ASTM tests which are at least about 10% improved compared to corresponding performance characteristic values of the petroleum fuel. The performance characteristic values include a cetane number, lubricity value, sulfur content, oxidative stability value, and others.

In another embodiment of the invention, the blended fuel has a well-to-wheels greenhouse gas content which is at least 5% lower than the well-to-wheels greenhouse gas content of the petroleum fuel. The blended fuel also has at least two performance characteristic values measurable by ASTM tests which are at least about 5% improved than corresponding performance characteristic values of the petroleum fuel.

In another aspect of the invention, a process for producing a blended fuel is provided. The process includes converting a natural gas feedstock into a syngas and reacting the syngas with a catalyst to produce a synthetic fuel. About 5% to 95%, by volume, of a petroleum fuel and about 5% to about 95%, by volume, of a low carbon fuel (total 100% volume) are blended together.

In one embodiment, the synthetic fuel has a cetane number of greater than about 65. In another embodiment, the synthetic fuel has a lubricity value which is less than about 450 microns by HFRR at 60° C. (scar) measured by ASTM D 6079.

In yet another embodiment, the blended fuel has a cetane number of greater than about 60, 70, or 75. In yet another embodiment, the blended fuel has a lubricity value which is less than about 450 microns by HFRR at 60° C. (scar) measured by ASTM D 6079. In some embodiments, the blended fuel has a lubricity value which is less than about 400 microns or less than 350 microns by HFRR at 60° C. (scar) measured by ASTM D 6079.

Other objects, features, and advantages of the present invention will become apparent upon consideration of the following detailed description and the accompanying drawings.

DETAILED DESCRIPTION

Figure 1:
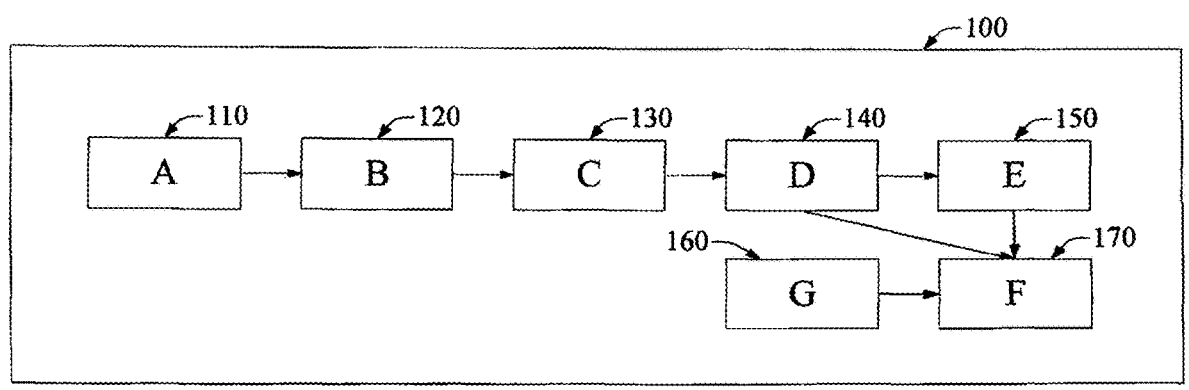
FIG. 1 shows a schematic diagram of a process for making a blended fuel comprising a petroleum fuel and a synthetic fuel produced from a natural gas type feedstock.

Embodiments of the invention provide a blended fuel and a method for making the blended fuel, where the blended fuel comprises a petroleum fuel blended with at least 10%, by volume, of a synthetic fuel derived from a natural gas type feedstock. The synthetic fuel in accordance with embodiments of the invention has a well-to-wheels greenhouse gas content ("WWGGC") which is at least about 20% lower than a well-to-wheels greenhouse gas content of the petroleum fuel.

Furthermore, when a low carbon fuel in accordance with embodiments of the invention is blended with a petroleum fuel, the low carbon fuel improves two or more performance characteristics described in the corresponding ASTM specification for the fuel compared to the petroleum fuel. The performance characteristics include, for example, a cetane number, a lubricity value, an oxidative stability value, a sulfur content, and others.

A number of performance characteristics of a fuel can be measured by standard test methods, such as various ASTM standard tests. For example, for a diesel fuel, a cetane number of the fuel can be tested by a standard test method ASTM D613. The cetane number provides a measure of the ignition characteristics of diesel fuel oil in compression ignition engines. This test method covers the determination of the rating of diesel fuel oil in terms of an arbitrary scale of cetane numbers using a single cylinder, four-stroke cycle, variable compression ratio, and indirect injected diesel engine. The cetane number scale covers the range from zero to 100.

In embodiments of the invention, a low carbon fuel has a cetane number of greater than about 60, 65, 70, 75, or higher.

Lubricity refers to the ability of a fluid to minimize the degree of friction between surfaces in relative motion under load conditions. A lubricity value of a fuel can be measured by a standard test method, such as ASTM D6079 or D6751. ASTM D6079 is a standard test method for evaluating lubricity of diesel fuels by the high-frequency reciprocating rig (HFRR). The wear scar generated in the HFRR test is sensitive to contamination of the fluids, test materials, and the temperature of the test. It is measured in terms of a diameter of wear scar in microns.

In embodiments of the invention, a low carbon fuel has a HFRR lubricity value of less than about 500 microns. More typically, a low carbon fuel in accordance with the present invention has a HFRR lubricity value of less than about 450 microns, 400 microns, 350 microns, 300 microns, 250 microns, 200 microns, or less.

The sulfur content of a fuel can be measured by various standard test methods, such as ASTM D5453. As of September 2007, most on-highway diesel fuel sold at retail locations in the United States is ultra-low sulfur diesel with an allowable sulfur content of 15 ppm.

In embodiments of the invention, a low carbon fuel has sulfur content of less than 5 ppm.

The oxidative stability value can be measured by standard test methods, such as ASTM D2274-10. This test method provides a basis for the determination of the storage stability of middle distillate such as No. 2 fuel oil. A fuel is tested under specified oxidizing conditions at 95° C.

In embodiments of the invention, a low carbon fuel has an oxidative stability value that is at least 10% improved over petroleum derived fuels.

All of these and other suitable ASTM standards can be adopted to test performance characteristics of fuels in accordance with embodiments of the invention. These and other ASTM standard test methods are hereby incorporated by reference in their entirety.

The performance characteristics (e.g., measured by ASTM tests) of a low carbon fuel in accordance with the present invention are at least 20%, 30%, 40%, 50%, 60%, 70%, 80%, or 90% better or improved than corresponding performance characteristic values of a petroleum fuel which is to be blended with the low carbon fuel. By "better" or "improved," a specific performance characteristic value (e.g., cetane number) of a low carbon fuel can be higher or lower than the corresponding value for a petroleum fuel.

For example, if a petrodiesel has a cetane number of 50 and a low carbon diesel fuel in accordance with the present invention has a cetane number of 70, then the cetane number of the low carbon fuel is 40% better or improved compared to the cetane number of the petroleum fuel.

In another example, if a petrodiesel has a lubricity value of 600 microns in wear scar and a low carbon diesel fuel in accordance with the present invention has a lubricity value of 300 microns, then the lubricity value (in terms of wear scar diameter) of the lower carbon is considered 50% better or improved, compared to the lubricity value of the petrodiesel.

When a low carbon fuel in accordance with the present invention is blended with a petroleum fuel, blending improves at least two performance characteristics of a blended fuel by at least 5%, 10%, 15%, 20%, 30%, 40%, 50% or more, compared to the corresponding performance characteristics of the petroleum fuel.

For example, if a blended fuel is a diesel fuel (e.g., a petrodiesel combined with a low carbon fuel comprising C8+ fraction), the corresponding ASTM D975 specification includes performance characteristics such as lubricity, cetane, sulfur content, oxidative stability, and others. In embodiments of the invention, blending of a low carbon diesel fuel with a petrodiesel improve two or more of performance characteristics of ASTM D975. For example, if a petrodiesel has a cetane number of 50 and a low carbon diesel in accordance with the present invention has a cetane number of 70, a 15% blend (i.e., 15% low carbon diesel and 85% petrodiesel) has a cetane number of 53, which is 6% better or improved compared to the cetane number of the petrodiesel.

As used herein, the terms "a petroleum derived fuel" or "petroleum fuel" refers to a fuel derived from a fraction or fractions of a petroleum crude oil.

The term "diesel fuel" refers to any liquid fuel used in diesel engines. A diesel fuel includes a mixture of carbon chains that typically contain between 8 to 24 carbon atoms per molecule. A conventional diesel fuel is a petroleum derived diesel fuel or petrodiesel which is a distillate from crude oil obtained by collecting a fraction boiling at atmospheric pressure over an approximate temperature range of 200° C. to 350° C. degrees. A diesel fuel may also include a synthetic diesel derived from alternative sources (e.g., natural gas, natural gas liquids, carbon dioxide, renewable biomass, or other such feedstocks).

The term "well-to-wheels greenhouse gas content" refers to a calculation that is done using a greenhouse gas model, such as Argonne National Laboratories GREET ("Greenhouse gases, Regulated Emissions, and Energy Use in Transportation") model or another similar greenhouse gas model, that allows for the calculation of the amount of greenhouse gases that are produced throughout the entire lifecycle of the product (from "well to wheels"). The model takes into account among other things the production method, the feedstock used in the production, the type of fuel produced, transportation of the fuel to market, and the emissions produced from combustion of the fuel when it is used.

The most recent version of GREET includes more than 100 fuel pathways including petroleum fuels, natural gas fuels, biofuels, hydrogen and electricity produced from various energy feedstock sources. The most recent versions of the GREET model (GREET1_2012, REV 2) is available at http://greet.es.anl.gov/. The softwares for calculating WWGGC are readily available and can be downloaded by public. The GREET model can be used to calculate the energy use and greenhouse gas (GHG) emissions associated with the production and use of a particular type of fuel. Other models for calculating WWGGC is available. For example, CA-GREET is a modified version of GREET. See http://www.arb.ca.gov/fuels/lcfs/lcfs.htm#modeling.

The WWGGC calculations include two parts. First, a well-to-tank (WTT) life cycle analysis of a petroleum based fuel pathway includes all steps from crude oil recovery to final finished fuel. Second, a tank-to-wheel (TTW) analysis includes actual combustion of fuel in a motor vehicle for motive power. The WTT and TTW analyses are combined to provide a total well-to-wheel (WTW) analysis, which provides a calculation for a well-to-wheel greenhouse gas content ("WWGGC").

Thus, using the GREET or other models for calculating WWGGC, a WWGGC score of a particular fuel can be compared with a petroleum derived fuel such as gasoline or petrodiesel (which scores close to 100). The lower the WWGGC, the lower the amount of greenhouse gas a particular fuel produces during its lifecycle.

While some alternative or renewable fuels can provide some benefit in reducing WWGGC, when these fuels are blended with conventional, petroleum fuels, however, the performance characteristics of the petroleum fuels are negatively impacted or stay the same. For example, blending of a traditional ethanol lowers the cetane number of a diesel fuel, negatively impacting the combustion quality of the diesel fuel. Even at 20% ethanol, the cetane number of the diesel fuel which includes ethanol barely meets performance specifications for diesel fuels.

Furthermore, other renewable fuels, such as a biodiesel mixture in a diesel fuel also lowers cetane number. Neat biodiesel typically has a cetane number between 40 and 55, which when blended with petrodiesel will either have no impact or a detrimental impact on cetane number.

In embodiments of the invention, alternative feedstocks (such as natural gas, natural gas liquids, associated gas, stranded gas, carbon dioxide, renewable biomass or other feedstocks) are processed in a suitable system to produce unique synthetic fuels. In certain embodiments, synthetic fuels are diesel fuels from natural gas, associated gas, stranded gas, or other gas feedstocks. Synthetic fuels according to the invention provide an improvement in WWGGC over the petroleum fuel baseline and also provide an improvement in various performance characteristics, such as cetane number and lubricity.

Alternative feedstocks can be converted into synthetic liquid fuels using a variety of processes including biochemical and thermochemical approaches. For example, using biological processes that use microorganisms or enzymes, biomass can be converted into diesel fuel, gasoline, ethanol, butanol, or other liquid fuels. Using a thermochemical conversion process, natural gas, renewable resources, or other feedstocks can be converted into syngas using partial oxidation, stream methane reforming, gasification, autothermal reforming, and other methods. After conversion to syngas, the syngas can be catalytically converted into liquid fuels. Other thermochemical processes include the production of fuels from pyrolysis oils, hydroprocessing of waste animal fats, and other processes. Other processes include the oxidative coupling of methane to produce chemicals (such as ethylene) or fuels.

In one embodiment, a blended fuel may include a synthetic diesel fuel and a petrodiesel. In another embodiment, a synthetic diesel fuel is a non-ester diesel fuel. Such blended fuels may meet the standards and specifications detailed in ASTM D975, which is the same standards and specifications for petrodiesel fuels. Contrary to a synthetic diesel in accordance with the present invention, a biodiesel (i.e., a fuel comprised of mono-alkyl esters of long chain fatty acids derived from vegetable oils or animal fats) and its blends must meet the specifications of a different standard, ASTM D 6751. In another embodiment, the blended fuel may include a fuel which is comprised of a non-ethanol or non-alcohol hydrocarbon fuel.

Embodiments of the invention provide for a number of advantages. For example, blending a synthetic fuel according to the present invention with a petroleum fuel reduces the world's dependence on fossil fuels and crude oils. A synthetic fuel and its blend according to the present invention has a lower WWGGC and produces a lower amount of greenhouse gas emissions during the production and consumption of the fuel. Furthermore, by blending a low carbon fuel to a petroleum fuel, the performance characteristics of the blended fuels in accordance with the present invention, such as lubricity and cetane number, are improved compared to the petroleum derived fuel.

Examples of embodiments of the invention are illustrated using figures and are described below. The figures described herein are used to illustrate embodiments of the invention, and are not in any way intended to limit the scope of the invention.

Referring more specifically to the drawings, FIG. 1 illustrates a schematic flow diagram (100), starting from the production of syngas from a renewable biomass feedstock (in Block A) to the blending of a low carbon fuel produced from the syngas with a petroleum fuel (in Block F).

A. Syngas Production

In FIG. 1, block A (110) refers to any process that produces a syngas. Syngas can be generated from a wide variety of resources. These include, for example, natural gas, natural gas liquids, cellulosic waste materials such as agricultural wastes, vegetative wood waste, energy crops, tree trimmings, carbon dioxide, or combinations thereof. A suitable syngas generator can be used to thermally convert a carbonaceous feedstock to syngas. Examples of syngas generators and systems include partial oxidation, pyrolyzers, gasifiers, steam or hydro-gasification systems, steam reformers, autothermal reformers or combinations of these technologies.

Any suitable system and apparatus can be used to generate syngas from renewable biomass feedstocks and to catalytically convert the syngas to a low carbon fuel. In one embodiment, an integrated system can be used where the system is configured to generate liquid fuels, electricity, and heat from carbonaceous feedstocks. Such a system is described in copending U.S. patent application Ser. No. 11/966,788, filed on Dec. 28, 2007 (published as US2010/0175320), which is incorporated herein by reference in its entirety.

In the integrated system described in copending U.S. patent application Ser. No. 11/966,788, the process for producing syngas and subsequent liquid fuels are optimized by using an on-line computer system with the use of one or more continuous gas analyzers to measure gas concentrations and process algorithms to control and maximize product use and energy efficiency. The characteristics of syngas can be analyzed by gas analyzers (e.g., mass spectrometer) and the carbon monoxide and hydrogen ratios can be adjusted by varying operating conditions of the syngas production process. The gas analyzers can measure concentrations of various gas species, such as oxygen, nitrogen, hydrogen, carbon monoxide, and others.

In some embodiments, the system can convert a natural gas, natural gas liquids or other feedstocks into syngas, where the conversion system uses partial oxidation with air or oxygen to produce syngas. Other suitable systems may also be used in the production of syngas from renewable biomass feedstocks.

B. Syngas Cleanup and Conditioning

In FIG. 1, block B (120) represents syngas cleanup and conditioning processes. Clean syngas free of impurities (which may affect catalyst performance and lifetime) allows for an efficient and economical operation. Impurities may include hydrogen sulfide, ammonia, chlorides, hydrogen cyanide, and other contaminants that result from a syngas production process. Syngas cleanup processes are well known and described in the art. For example, syngas cleanup processes may include sulfur clean up catalysts, particulate filters, tar cracking, hydrolysis, and other technologies to produce clean syngas for subsequent conversion to fuels or chemicals. In certain embodiments, syngas cleanup and conditioning processes may be included in the syngas generation system.

C. Catalytically Reacting Syngas to Produce Hydrocarbon Products

In FIG. 1, block C (130) represents conversion of syngas into various products. For instance, a clean syngas stream (e.g., CO, $H_2$, $CH_4$, $CO_2$ and $H_2O$ at varying concentrations) is introduced to a catalytic reactor to generate liquid fuels from CO and $H_2$ among other products. The catalytic hydrogenation of carbon monoxide produces light gases, liquids and waxes, ranging from methane to heavy hydrocarbons ($C_{25}$ and higher) in addition to oxygenated hydrocarbons. This process is referred to Fischer-Tropsch synthesis. The Fischer-Tropsch synthesis is used to produce distillate fuels (e.g., gasoline, diesel, aviation fuel, and others) or specialty chemicals (e.g. higher alcohols, paraffins, olefins, and others) from syngas.

In Fischer-Tropsch synthesis, the hydrocarbon product selectivity depends on diffusion, reaction, and convection processes occurring within the catalyst pellets (i.e., supported catalyst) and reactor. In embodiments of the invention, catalyst support or pellets can have any suitable shapes. For example, the catalyst shape may be an extrudate with a lobed (e.g., tri-lobes, quad-lobes, and others), fluted, or varied cross section but can be a sphere, granule, powder, or other support that allows efficient operation. For lobed supports, the effective pellet radius (i.e., the minimum distance between the mid-point and the outer surface portion of the pellet) may be about 600 microns or less, or about 300 microns or less.

In certain embodiments, the catalyst support material may be porous, and the mean pore diameter of the support material may be greater than about 100 angstroms, and in some instances, greater than about 120 angstroms. The catalyst support ideally has a crush strength of between about 3 lbs/mm and 4 lbs/mm and a BET surface area of greater than about 150 $m^2/g$. By contrast, conventional high surface area supports typically have an average pore diameter of less than 100 angstroms.

Supports that have a large average pore volume greater than about 120 angstroms generally have a surface area much lower than 150 $m^2/g$ and a crush strength below 2 lbs/mm despite additional calcination or heat treatment. In embodiments of the invention, this can be achieved with the addition of a structural stabilizer that provides additional crystallinity (for example silicon or silica oxide). This provides more strength upon heat treatment.

Any suitable material can be used as a support material in the Fischer-Tropsch process. These include metal oxides, such as alumina, silica, zirconia, magnesium, or combinations of these materials. Preferably, alumina is used as a support material to make a supported catalyst.

The catalytically active metals, which are included with or dispersed to the support material, include substances which promote the production of hydrocarbon fuel (e.g., diesel) in the Fischer-Tropsch reaction. For example, these metals include cobalt, iron, nickel, or any combinations thereof. Various promoters may be also added to the support material. Examples of promoters include ruthenium, palladium, platinum, gold, nickel, rhenium, or any combinations thereof. The active metal distribution or dispersion on the support is ideally between about 2% and about 20%, preferably about 4%.

In one embodiment, a supported catalyst includes cobalt, iron, or nickel deposited at between about 2 weight % and 50 weight % on gamma alumina, more typically about 20 weight % on gamma alumina, based on the total weight of the supported catalyst. Also, the supported catalyst formulation includes selected combinations of one or more promoters consisting of ruthenium, palladium, platinum, gold nickel, rhenium, and combinations in about 0.01-2.0 weight % range, more typically in about 0.1-0.5 weight % range per promoter. Production methods of the catalyst include impregnation and other methods of production commonly used in the industry and are described in the art.

In embodiments of the invention, low temperature, in-situ reduction procedures are used to prepare catalysts. In one embodiment, the catalyst is reduced in-situ in the multi-tubular fixed bed reactor at temperatures below 550° F. Typical Fischer-Tropsch catalysts are reduced ex-situ (before loading into the reactor) and at temperatures above 600° F., and can be as high as 400° C. (750° F.).

In one embodiment, a syngas stream is reacted with a supported catalyst under specific operating conditions to produce a product stream comprising light gases, diesel fuel and a wax, where more diesel fuel is produced than wax. The reaction is also operated at temperatures between about 350° F. and 460° F., more typically around 410° F.

D. Hydrocarbon Fuel Separation and Upgrading Processes

In FIG. 1, block D (140) includes product separation processes whereby a liquid fuel (e.g., a low carbon diesel fuel) is separated from other products. For example, liquid and wax products are condensed out of a product gas stream and the light gases are recycled back to the catalytic reactor and/or may be used for power production or other parasitic load requirements. Block D may also include condensing out the product gas stream into a product mixture comprising a low carbon fuel (e.g., diesel derived from renewable biomass feedstock), water, and wax in a single knock out vessel wherein the wax stays entrained in the water fraction for ease of separation from the low carbon fuel fraction.

The products produced from the process described in step C may be upgraded to produce a desired fuel fraction. Upgrading may be conducted on a liquid product (typically a C8-C24 fuel fraction), light gas fraction (typically a C4-C7 gas fraction), or a solid "wax" fraction (typically a C25+ solid wax fraction). Upgrading processes may include hydrocracking, hydroisomerization, distillation, thermal cracking, hydroprocessing, or other known and emerging upgrading processes.

In one embodiment of the invention, waste heat and/or steam from the syngas production and fuel production steps in the process are utilized by another process or plant that requires this heat or steam. Plants can be co-located on the same site as the other process or plant, thereby efficiently and cost effectively sharing heat and/or steam. Examples of process plants that are good host sites include food processing facilities, other energy facilities such as oil and gas production, power plants, renewable energy plants, or other similar types of plants. This approach also reduces the WWGGC score of the fuels produced by the process, since fossil energy use is reduced at the co-located plant site.

E. Conditioning Step

In FIG. 1, block E (150) represents an optional step or steps to condition a synthetic fuel to further improve its properties. In block E, a small percentage of a cold flow improver may be blended into the low carbon fuel fraction in order to help cold flow properties of the fuel for use in cold climates.

F. Blending a Synthetic Fuel with a Petroleum Fuel

In block F (170) of FIG. 1, a petroleum fuel is blended with a synthetic fuel produced from a natural gas feedstock. The synthetic fuel is separated in block D (140) (or from block E (150), if the synthetic fuel is further processed to improve its properties) or may be blended from a petroleum fuel from block G (160). Any suitable amount of a low carbon fuel may be added to the petroleum fuel. For example, about 5% to about 95%, by volume, of a petroleum fuel may be mixed with about 95% to about 5%, by volume, of a synthetic fuel produced from a natural gas feedstock. Typically, at least about 5%, 10%, 15%, 20%, 25%, 30%, 40%, 50%, 60%, 70%, or 75% or more, by volume, of a low carbon fuel is blended with the rest of balance from the petroleum fuel.

The mixing proportion of a synthetic fuel and a petroleum fuel may depend on various factors, including the level of WWGGC reduction or performance characteristics desired in the blended fuel (e.g., lubricity, cetane number, sulfur content, and others). In some instances, more than one type of synthetic fuel may be blended with a petroleum fuel. For example, a petroleum fuel may be blended with a mixture of synthetic diesel fuels derived from two or more different types of feedstock sources. Blending methods may include splash blending, mixing, blending in fuel trucks, or other known and emerging methods.

Blended fuels according to embodiments of the invention have a number of performance characteristics measurable by ASTM tests which are superior compared to the corresponding characteristics of the petroleum fuel. For example, a blended fuel in accordance with embodiments of the invention may have a cetane number which is greater than about 55, 60, 65, 70, 75, 80, or higher.

In another example, a blended fuel in accordance with the present invention can have a HFRR lubricity value of less than about 500 microns in wear scar diameter. In some instances, a HFRR lubricity value may be less than about 450 microns, 400 microns, 350 microns, 300 microns, 250 microns, 200 microns, 150 microns, 100 microns, or less.

In yet another example, a blended fuel in accordance with the present invention can have a sulfur content of less than 10 ppm, 5 ppm, 2 ppm, 1 ppm, 100 ppb, of less.

In yet another example, a blended fuel in accordance with the present invention can have an oxidative stability value that is 10% better than petroleum derived fuels.

To further illustrate embodiments of the present invention, the following examples are provided.

Example #1

In this example, a synthetic diesel fuel is produced from an associated gas feedstock that is being flared. Associated gas, which is produced in conjunction with oil, is sometimes flared due to lack of available infrastructure to get the gas to market. According to the World Bank, gas flaring produces some 400 million tons of greenhouse gas emissions per year worldwide.

The associated gas is used in conjunction with air or oxygen to produce a syngas using a partial oxidation system.

The syngas feed is then introduced into a multi-tubular fixed bed reactor of a tube which includes supported catalysts. The catalyst bed is operated at a pressure of 400 psi and a temperature of 400 F. Diesel fuel is produced directly from syngas without the need for hydro-cracking of wax which is typical of other Fischer Tropsch processes.

The WWGGC of the synthetic diesel fuel is calculated according to the GREET model. The synthetic diesel fuel produced according to this example has a lifecycle greenhouse gas score (e.g., WWGGC) that is 35% lower than traditional, petroleum derived diesel fuel. The synthetic diesel fuel is blended at 25%, by volume, with the balance as petroleum derived diesel fuel. The resulting blendstock reduces the greenhouse gas score by 8.75% over petroleum derived diesel fuel alone.

In addition, the synthetic diesel fuel has a cetane number that is 70 (traditional petroleum diesel fuels have a cetane number of 50). The cetane number can be measured according to ASTM D-613 specification. The synthetic diesel fuel has a cetane number which is 40% higher than a cetane number of a traditional petroleum diesel fuel. When the synthetic diesel fuel is blended at 25%, by volume, with the rest of balance from a petroleum diesel fuel, the blended fuel has a cetane number which is at least 10% higher than the cetane number of the petroleum diesel fuel.

A lubricity value of a fuel is measured according to ASTM D 6079. The synthetic diesel fuel has a lubricity value of 320. The synthetic diesel fuel has a lubricity value which is about 40% better than that of the petroleum diesel fuel.

Example #2

The synthetic diesel fuel produced in example #1 is blended in varying proportions with a California #2 diesel fuel (CA2), which is a low sulfur diesel fuel sold throughout California. The synthetic diesel fuel is blended at 25%, 50%, and 75%, by volume, with the rest of the balance from the CA2 fuel. The cetane numbers of various blends are measured according to ASTM D613.

The 100% CA2 fuel has a cetane number of 50. The 100% synthetic diesel fuel has a cetane number of 75. When 75% (by volume) of synthetic diesel fuel is blended with 25% (by volume) of CA2 fuel, the cetane number of the blend is 75. When the synthetic diesel fuel and the CA2 fuel is blended in equal proportions by volume (i.e., 50%/50%), the cetane number is about 71 which is only slightly lower than the cetane number of 100% synthetic diesel fuel. When 25% (by volume) of synthetic diesel fuel is blended with 75% (by volume) of CA2 fuel, the cetane number of the blended fuel is 60.

Figure 2:
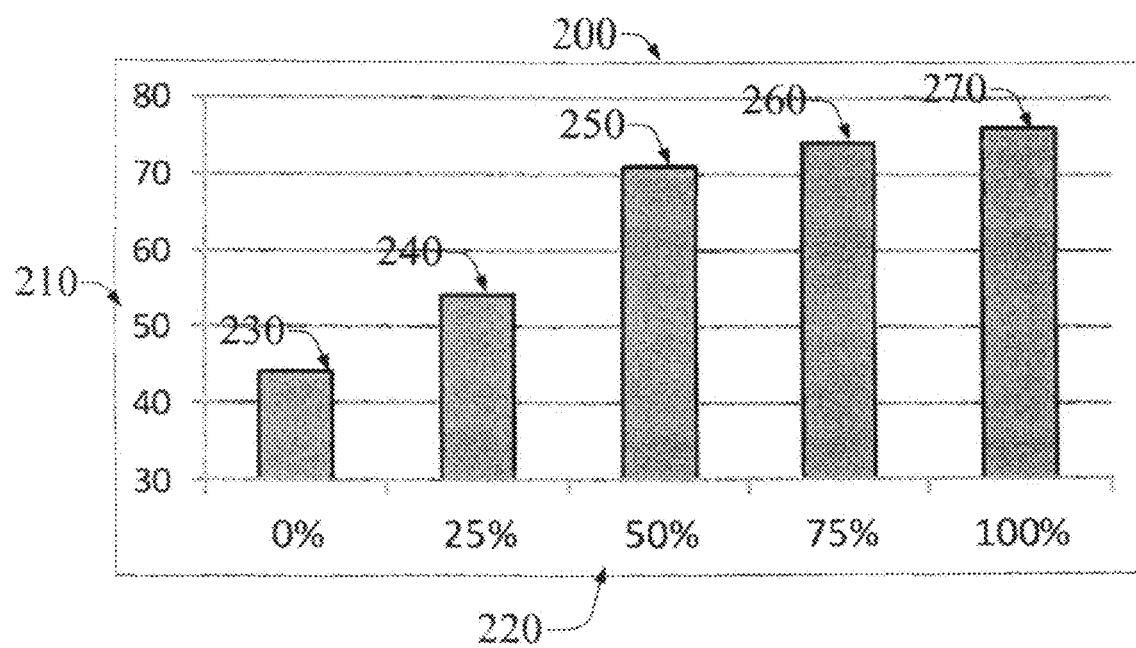
FIG. 2 shows cetane numbers of blended fuels comprising varying proportions of a synthetic fuel derived from natural gas type feedstocks and a traditional petroleum fuel, CARB.

The cetane number of the blend increases non-linearly as the proportion of the synthetic diesel fuel becomes higher in the blend. It is surprising to find that when 75% of the synthetic diesel fuel is blended with 25% of the CARB fuel, the cetane number of the blend is about the same as the 100% synthetic diesel fuel as shown in FIG. 2.

Example #3

The synthetic diesel fuel produced in example #1 is blended in varying proportions with a CA2 fuel. The synthetic diesel fuel is blended at 25%, 50%, and 75%, by volume, with the rest of the balance from the GARB fuel. The lubricity value of various blends were measured according to ASTM D 6079 which measures lubricity of diesel fuels by the high frequency reciprocating rig (HFRR).

Figure 3:
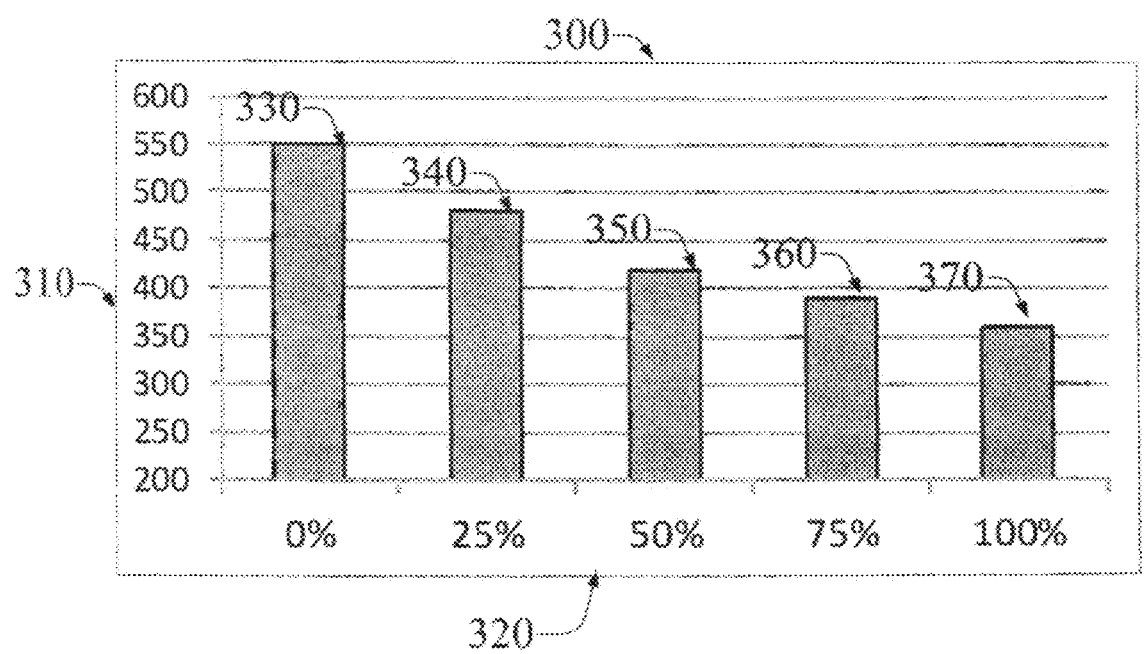
FIG. 3 shows HFRR lubricity values of blended fuels comprising varying proportions of a synthetic fuel derived from natural gas type feedstocks and a traditional petroleum fuel, GARB.

As shown in FIG. 3, adding the synthetic diesel fuel to the CA2 fuel non-linearly impacts the lubricity value of the blended fuel. The 100% CA2 fuel had a HFRR wear scar diameter of about 600 microns, which is substantially higher than a HFRR wear scar diameter of the synthetic diesel fuel, which is about 225 microns. When the synthetic fuel is blended at 25% by volume with the GARB fuel at 75% by volume, the lubricity value of the blended fuel is reduced to a HFRR wear scar diameter of about 360 diameter. Thus, blending 25% by volume of synthetic diesel fuel reduced the HFRR wear scar diameter by 40%. When the synthetic fuel is blended at 50% by volume with the CA2 fuel at 50% by volume, the blended fuel has a HFRR wear scar diameter of about 340 diameter. When 25%, by volume, of the synthetic fuel is blended with 75%, by volume, of the CA2 fuel, the blended fuel still has a HFRR wear diameter of about 340 diameter. Thus, blending greatly impacts the lubricity of the blended fuel when 25% of the synthetic fuel is added, but its effect on lubricity appears to reach a plateau at 50% blending.

Comparative Example #3

Instead of using the synthetic diesel fuel produced in Example #1, a traditional biofuel is blended with the CARB fuel. The synthetic fuel is produced from natural gas and other gas phase feedstocks using a steam methane reformer for syngas production and the syngas is then converted into synthetic diesel fuel using a catalyst in a multi-tubular reactor.

The synthetic fuel is blended in varying proportions with the CA2 fuel. The synthetic diesel fuel is blended at 25%, 50%, and 75%, by volume, with the rest of the balance from the CA2 fuel. The lubricity values of various blends are measured according to ASTM D 6079 which measures lubricity of diesel fuels by the high frequency reciprocating rig (HFRR).

Figure 4:
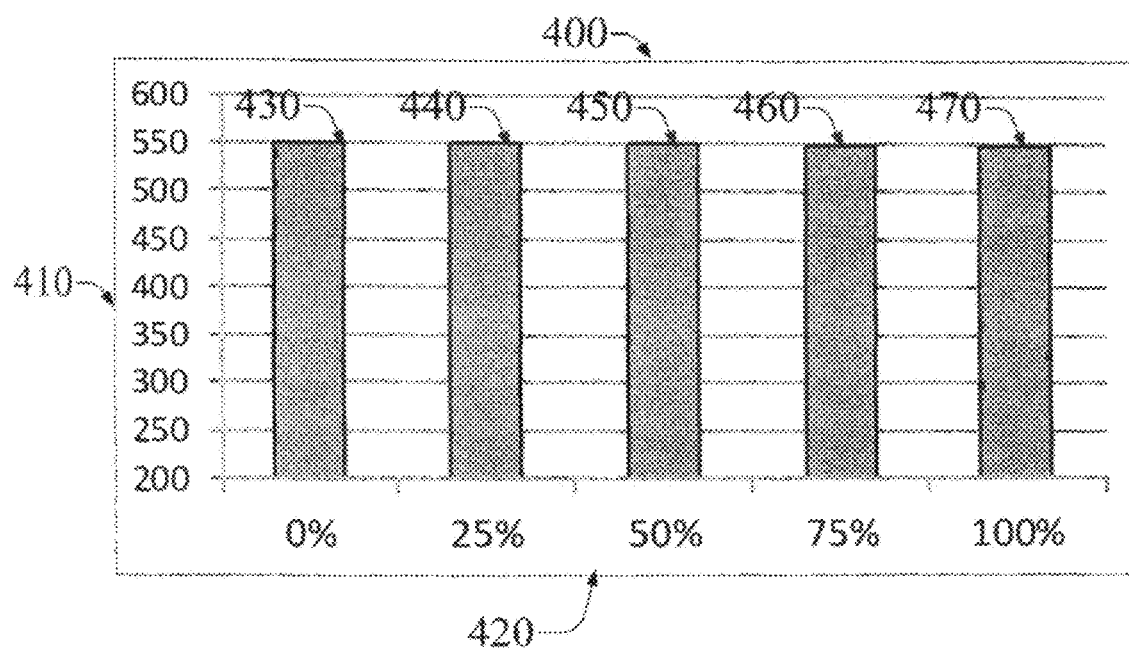
FIG. 4 shows HFRR lubricity values of blended fuels comprising varying proportions of a traditional biofuel derived from vegetable oils and animal grease and a traditional petroleum fuel.

The results are shown in FIG. 4. The 100% CA2 fuel has a HFRR wear scar diameter of about 600 microns. The 100% synthetic fuel has a HFRR wear scar diameter of about 580 microns. When the two fuels are blended at different proportions (i.e., 25%, 50%, or 75% of biodiesel fuel with the balance from the CARB fuel), adding the traditional biofuel provides no or low improvement on lubricity values of the blends.

Although the description above contains many details, these should not be construed as limiting the scope of the invention but as merely providing illustrations of some of the presently preferred embodiments of this invention. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. A blended fuel consisting of:
   (a) a petroleum fuel; and
   (b) a synthetic fuel produced using a biochemical conversion process, wherein the synthetic fuel is a biodiesel mixture;
   wherein the synthetic fuel has a well-to-wheels greenhouse gas content which is at least about 20% lower than a well-to-wheels greenhouse gas content of the petroleum fuel, and the synthetic fuel has at least two performance characteristic values measurable by ASTM tests which are at least about 40% improved than corresponding performance characteristic values of the petroleum fuel; and
   wherein the blended fuel has a well-to-wheels greenhouse gas content which is at least 5% lower than the well-to-wheels greenhouse gas content of the petroleum fuel, and the blended fuel has at least two performance characteristic values measurable by ASTM tests which are at least about 10% improved than corresponding performance characteristic values of the petroleum fuel, wherein one of the two performance characteristic values is cetane number.

2. The blended fuel of claim 1, wherein one of the two performance characteristic values of the blended fuel is selected from a lubricity value, a sulfur content or an oxidative stability value.

3. The blended fuel of claim 2, wherein the lubricity value of the synthetic fuel is at least 40% lower than the lubricity value of the petroleum fuel as measured by ASTM D 6079.

4. The blended fuel of claim 2, wherein the cetane number of the synthetic fuel is at least 40% higher than the cetane number of the petroleum fuel measured by ASTM 0613.

5. The blended fuel of claim 2, wherein the lubricity value of the synthetic fuel is less than about 450 microns by HFRR at 60° C. (scar) measured by ASTM D 6079.

6. The blended fuel of claim 2, wherein the lubricity value of the blended fuel is less than about 450 microns by HFRR at 60° C. (scar) measured by ASTM D 6079.

7. The blended fuel of claim 2, wherein the cetane number of the synthetic fuel is greater than about 65 measured by ASTM D 613.

* * * * *